United States Patent
Takahashi et al.

(10) Patent No.: US 11,100,776 B2
(45) Date of Patent: Aug. 24, 2021

(54) IMAGING APPARATUS AND IMAGING METHOD

(71) Applicant: Panasonic Intellectual Property Management Co., Ltd., Osaka (JP)

(72) Inventors: Takeshi Takahashi, Fukuoka (JP); Takanobu Machida, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/680,972

(22) Filed: Nov. 12, 2019

(65) Prior Publication Data
US 2020/0152031 A1 May 14, 2020

(30) Foreign Application Priority Data
Nov. 13, 2018 (JP) .............................. JP2018-212944

(51) Int. Cl.
*G08B 13/196* (2006.01)
*H04N 7/18* (2006.01)
*H04N 5/232* (2006.01)

(52) U.S. Cl.
CPC . *G08B 13/19669* (2013.01); *G08B 13/19602* (2013.01); *H04N 5/23206* (2013.01); *H04N 7/183* (2013.01)

(58) Field of Classification Search
CPC ........ G08B 13/19669; G08B 13/19602; G08B 13/1968; G08B 25/008; H04N 7/183; H04N 5/23206; H04N 7/188; H04N 7/185; H04N 5/23245
USPC ................................................ 348/160, 143
See application file for complete search history.

(56) References Cited

U.S. PATENT DOCUMENTS

| | | | | |
|---|---|---|---|---|
| 9,979,625 | B2* | 5/2018 | McLaughlin | ......... H04L 9/0841 |
| 2002/0180878 | A1 | 12/2002 | Iida et al. | |
| 2012/0092158 | A1* | 4/2012 | Kumbhar | ............... G08B 15/00 340/539.13 |
| 2015/0222517 | A1* | 8/2015 | McLaughlin | ......... G06F 21/445 713/156 |
| 2016/0258647 | A1* | 9/2016 | Imes | ..................... G06F 3/0484 |
| 2016/0343237 | A1* | 11/2016 | Herman | ............... G08B 25/008 |
| 2017/0264383 | A1* | 9/2017 | Reddy | ................. H04W 68/005 |
| 2017/0265039 | A1* | 9/2017 | Bruck | .................... H04L 67/26 |
| 2018/0176112 | A1* | 6/2018 | McLaughlin | ........... H04W 4/70 |
| 2018/0260777 | A1* | 9/2018 | Judge | .................. A47G 29/141 |
| 2018/0278462 | A1* | 9/2018 | Bjontegard | ........... A63F 13/217 |
| 2018/0348718 | A1* | 12/2018 | Richardson | ............ G08B 21/22 |

FOREIGN PATENT DOCUMENTS

JP        2002-354326 A        12/2002

* cited by examiner

*Primary Examiner* — Tung T Vo
(74) *Attorney, Agent, or Firm* — Seed IP Law Group LLP (57) ABSTRACT

Provided is an imaging apparatus disposed within a building and wirelessly transmitting a captured image to a plurality of electronic devices. The imaging apparatus includes: a camera; a receiver that receives information regarding a distance between the plurality of electronic devices and the building from each of the plurality of electronic devices; and a controller having a first operation mode in which the camera starts capturing when an object moves and a second operation mode in which the camera does not start capturing video even when the object moves, the controller switching between the first operation mode and the second operation mode based on the information.

7 Claims, 10 Drawing Sheets

| MODE | TRIGGER | OPERATION SETTING |
|---|---|---|
| HOME MODE | WHEN SHIFTED TO HOME MODE | PRIVACY MODE: ON |
| AWAY MODE | WHEN DETECTING MOTION | RECORDING TIME: 1 MIN. |
| | | PUSH NOTIFICATION: ON |
| | WHEN SHIFTED TO AWAY MODE | PRIVACY MODE: OFF |

IMAGING APPARATUS AND IMAGING METHOD

CROSS REFERENCE TO RELATED APPLICATIONS

This application is entitled to and claims the benefit of Japanese Patent Application No. 2018-212944, filed on Nov. 13, 2018, the disclosure of which including the specification, drawings and abstract is incorporated herein by reference in its entirety.

TECHNICAL FIELD

The present disclosure relates to an imaging apparatus and an imaging method.

BACKGROUND ART

Conventionally, provided is an image capturing system configured with a camera and an operation apparatus capable of remotely controlling the camera. As such image capturing system, for example, there is a system that displays visual field positions and target positions of the camera on a scroll bar that is displayed on an image display (for example, see PTL 1).

CITATION LIST

Patent Literature

PTL 1
Japanese Patent Application Laid-Open No. 2002-354326

SUMMARY OF INVENTION

Technical Problem

Incidentally, even after residents of a building such as a house or an apartment room go out, there may be a case where they desire to take an image of how a pet is doing within the building, for example.

However, there is a case where some of family members goes out and other members stay at home to house-sit and the like, and those who are staying at home to house-sit and the like do not like to be photographed by the camera in such case.

Nonrestrictive embodiments of the present disclosure provides an imaging apparatus and an imaging method, which make it possible to select not to perform capturing by the camera when a person carrying an electronic device that enables viewing of the image of the camera is staying in the building.

Solution to Problem

An imaging apparatus according to one aspect of the present disclosure is an imaging apparatus disposed within a building and wirelessly transmitting a captured image to a plurality of electronic devices, the imaging apparatus including: a camera; a receiver that receives information regarding a distance with respect to the building from each of the plurality of electronic devices; and a controller having a first operation mode in which the camera starts capturing when an object moves, and a second operation mode in which the camera does not start capturing even when the object moves, the controller switching between the first operation mode and the second operation mode based on the information.

An imaging method according to one aspect of the present disclosure is an imaging method of an imaging apparatus disposed within a building and wirelessly transmitting a captured image to a plurality of electronic devices, the imaging method including: receiving information regarding a distance with respect to the building from each of the plurality of electronic devices; and controlling switching between a first operation mode in which a camera starts capturing when an object moves, and a second operation mode in which the camera does not start capturing even when the object moves based on the information.

Note that those comprehensive or specific modes may be achieved by a system, a device, a method, an integrated circuit, a computer program or a recording medium or may be achieved by any combinations of such system, device, method, integrated circuit, computer program, and recording medium.

Advantageous Effects of Invention

According to an aspect of the present invention, it is possible to select not to perform capturing by the camera when a person carrying an electronic device that enables viewing of the image of the camera is staying in the building.

More advantages and effects of the aspect of the present disclosure can be made apparent from the Description and the Drawings. While those advantages and/or effects are provided by some of the features disclosed in Embodiment, Description, and Drawings, it is not essential to employ all of those for acquiring one or more of the same feature.

DESCRIPTION OF EMBODIMENT

Hereinafter Embodiment of the present invention will be described in detail by referring to the accompanying drawings as appropriate. Note, however, that unnecessarily detailed explanations may be omitted. For example, detailed explanations for already well-known facts and duplicated explanations for substantially same configurations may be omitted in order to avoid unnecessarily redundant explanations for allowing those skilled in the art to understand easily.

Note that the accompanying drawings and explanations in the followings are provided for allowing those skilled in the art to fully understand the present disclosure, and that it is not intended to limit the gist of the scope of the appended claims thereby.

Figure 1:
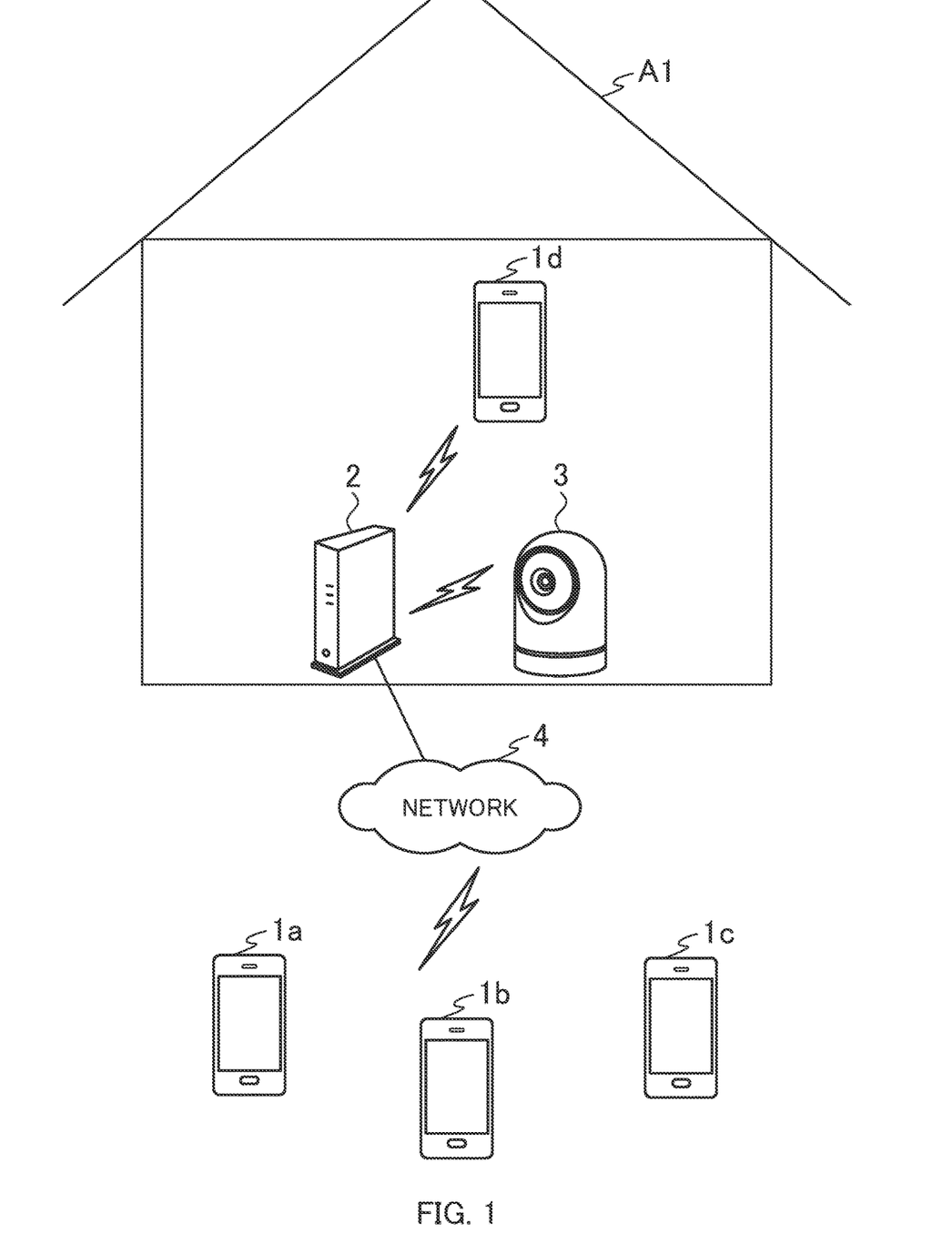
FIG. 1 is a block diagram illustrating a configuration example of an image capturing system according to Embodiment of the present disclosure.

FIG. 1 is a block diagram illustrating a configuration example of an image capturing system according to Embodiment of the present disclosure. As illustrated in FIG. 1, the image capturing system includes mobile devices 1a to 1d, router 2, and imaging apparatus 3.

In FIG. 1, building A1 is illustrated. Building A1 is a detached house or a room of an apartment building, for example. Router 2 and imaging apparatus 3 are disposed within building A1.

The image capturing system is used for imaging the state inside building A1 when nobody is staying at home, for example. The image capturing system is used for imaging how a pet is doing within building A1 when nobody is staying at home, for example. Further, the image capturing system is used for the security of building A1 when nobody is staying at home, for example.

Mobile devices 1a to 1d are electronic devices such as smartphones or tablet terminals. Mobile devices 1a to 1d communicate with imaging apparatus 3 via network 4 and router 2. Further, mobile devices 1a to 1d when located within building A1 may communicate with imaging apparatus 3 via router 2. Network 4 includes networks such as smartphone networks and the Internet, for example.

Mobile devices 1a to 1d are carried by residents of building A1, for example. For example, mobile devices 1a to 1d are carried by each of all the residents (four family members) of building A1. Mobile devices 1a to 1d display images captured by imaging apparatus 3 on a display apparatus. Hereinafter, the residents of building A1 may also be referred to as users.

Imaging apparatus 3 is a portable imaging apparatus. Imaging apparatus 3 is disposed in a room desired to be monitored when nobody is staying at home, such as a room where a pet is in, for example. Imaging apparatus 3 performs wireless communication with router 2, and communicates with mobile devices 1a to 1d via router 2 and network 4. Further, imaging apparatus 3 may also communicate with mobile devices 1a to 1d located within building A1 via router 2.

Imaging apparatus 3 has a motion detecting function. For example, imaging apparatus 3 starts capturing a video when an object such as a pet, a person, or the like within a capturing range moves. Capturing a video by imaging apparatus 3 includes recording of a moving image or transmission of the moving image to mobile devices 1a to 1d, for example. When recording, for example, imaging apparatus 3 records the moving image for 1 minute upon detecting motion of an object.

Imaging apparatus 3 starts capturing a video when an object moves while all of mobile devices 1a to 1d are away from building A1 by a prescribed distance or more. The prescribed distance is a distance with which the users of mobile devices 1a to 1d as the residents of building A1 can be assumed as being away from the building, for example. That is, imaging apparatus 3 starts capturing a video when the object moves while it is assumed that all the users of mobile devices 1a to 1d are out by carrying mobile devices 1a to 1d.

In the meantime, imaging apparatus 3 does not start capturing a video even when the object moves in a case where even one of mobile devices 1a to 1d is not away from building A1 by the prescribed distance or more. That is, when even one of users of mobile devices 1a to 1d is assumed to be staying in building A1, imaging apparatus 3 does not start capturing a video even when the object moves. In the example of FIG. 1, mobile device 1d exists within building A1. Therefore, imaging apparatus 3 does not start capturing a video even when the object moves.

The resident of building A1 when staying in building A1 generally does not like the residents who are away therefrom to see how the resident oneself is doing while staying at home. That is, the resident of building A1 wants to protect the privacy from the other residents while staying in building A1. In the meantime, the residents of building A1 want to see how the pet is doing within building A1 or want to monitor to check whether or not there is suspicious person in building A1 when all the residents are away.

As described above, the image capturing system of FIG. 1 does not start capturing by imaging apparatus 3 when even one of mobile devices 1a to 1d is not away from building A1 by the prescribed distance or more. That is, the image capturing system does not start capturing by imaging apparatus 3 when it is assumed that even one of the residents of building A1 is staying in building A1. Thereby, the resident staying in building A1 can protect the privacy from the other residents who are being away.

In the meantime, the image capturing system starts capturing by imaging apparatus 3 when the object moves while all of mobile devices 1a to 1d are away from building A1 by the prescribed distance or more. That is, the image capturing system starts capturing by imaging apparatus 3 according to motion of the object when it is assumed that all the residents of building A1 are away. Thereby, the residents of building A1 can see how the pet is doing within building A1 or monitor to check whether or not there is suspicious person in building A1.

While four mobile devices 1a to 1d are illustrated in FIG. 1, the number of mobile devices is not limited to that. There may be three or less mobile devices or five or more mobile devices. Further, the apparatus for displaying images of imaging apparatus 3 are not limited to mobile devices 1a to 1d. The apparatus for displaying images of imaging apparatus 3 may also be an electronic device such as a personal computer. Further, while it is indicated above that imaging apparatus 3 captures a moving image, it is also possible to capture a still image.

Figure 2:
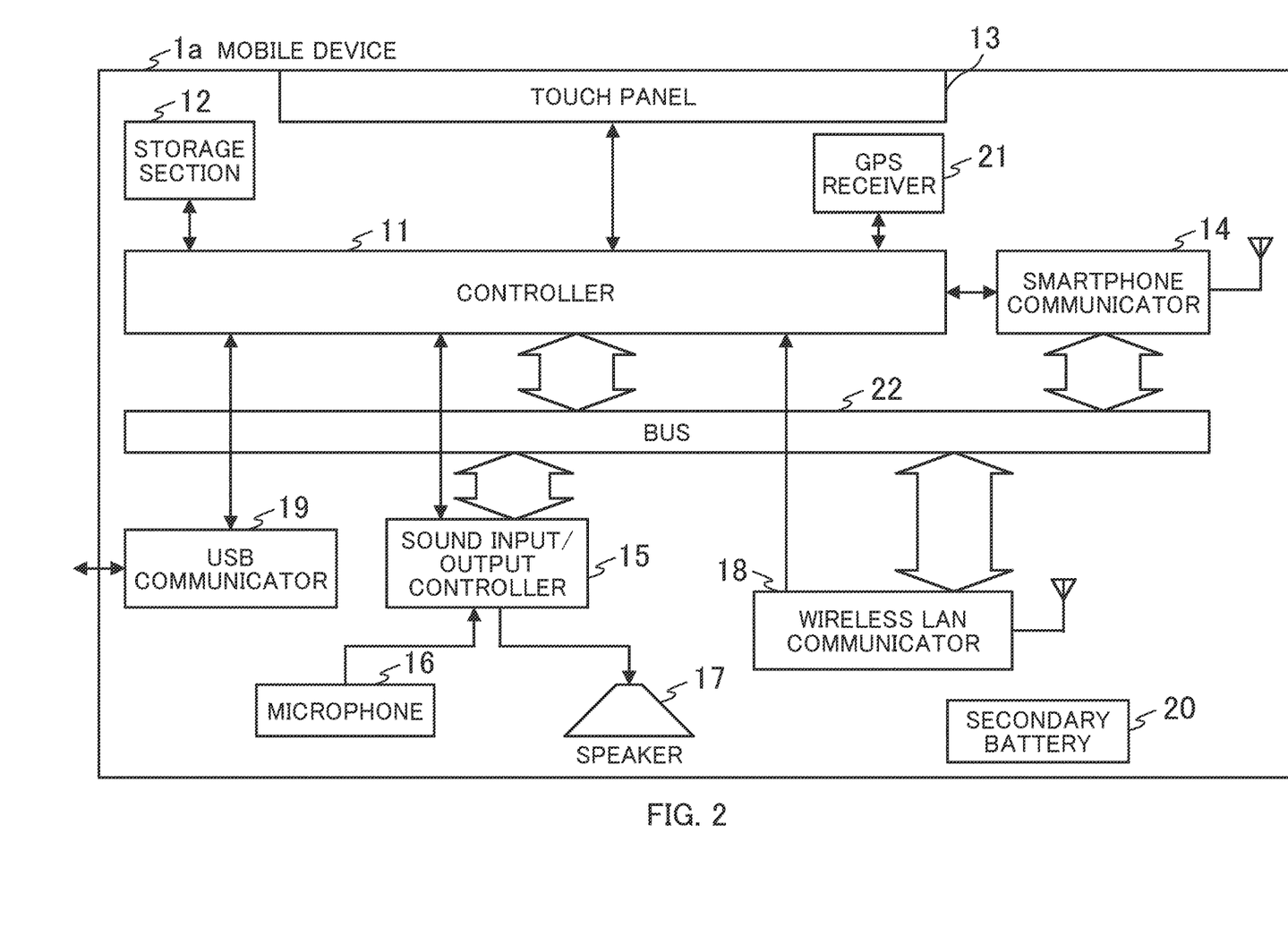
FIG. 2 is a block diagram illustrating a block configuration example of a mobile device.

FIG. 2 is a block diagram illustrating a block configuration example of mobile device 1a. As illustrated in FIG. 2, mobile device 1a includes: controller 11, storage section 12, touch panel 13, smartphone communicator 14, sound input/output controller 15, microphone 16, speaker 17, wireless LAN (Local Area Network) communicator 18, USB (Universal Serial Bus) communicator 19, secondary battery 20, GPS receiver 21, and bus 22.

Controller 11 controls entire mobile device 1a, for example. Controller 11 may be configured with a CPU (Central Processing Unit), for example.

Programs for operating controller 11 are stored in storage section 12. Further, data for performing calculation processing by controller 11, data for controlling each component by controller 11, and the like are stored in storage section 12. Storage section 12 may be configured with storage devices such as a RAM (Random Access Memory), a ROM (Read Only Memory), a flash memory, and an HDD (Hard Disk Drive).

Touch panel 13 is an apparatus including a display apparatus that displays images and a transparent plate-like input apparatus for receiving user operations provided on a screen of the display apparatus. Touch panel 13 displays images captured by imaging apparatus 3. Further, touch panel 13 receives tap operations, drag operations, long press operations, or the like, of the user, for example, and outputs signals according to the received operations to controller 11.

Smartphone communicator 14 is wirelessly connected to network 4 by using any wireless communication system such as 3G (3rd generation mobile communication system), 4G (4th generation mobile communication system), or 5G (5th generation mobile communication system). Smartphone communicator 14 exchanges data with other electronic devices via network 4.

Sound input/output controller 15, microphone 16, and speaker 17 inputs and outputs sound to and from outside.

Wireless LAN communicator 18 is wirelessly connected to router 2 by using a wireless communication system such as Wi-Fi (R), for example. Wireless LAN communicator 18 exchanges data with other electronic devices via router 2.

USB communicator 19 exchanges data with devices, memories, and the like having an interface of USB standard.

Secondary battery 20 supplies the power required for each components of mobile device 1a. Secondary battery 20 is a chargeable battery such as a nickel-metal hydride battery, a lithium-ion battery, or a lead battery.

GPS receiver 21 receives GPS signals transmitted from a plurality of GPS transmitters. GPS receiver 21 calculates the location of mobile device 1a based on the received GPS signal. GPS receiver 21 outputs the calculated location of mobile device 1a to controller 11. Note that controller 11 may calculate the location of mobile device 1a based on the GPS signal received by GPS receiver 21.

While the block configuration of mobile device 1a is described in FIG. 2, mobile devices 1b to 1d also have the same block configuration.

Figure 3:
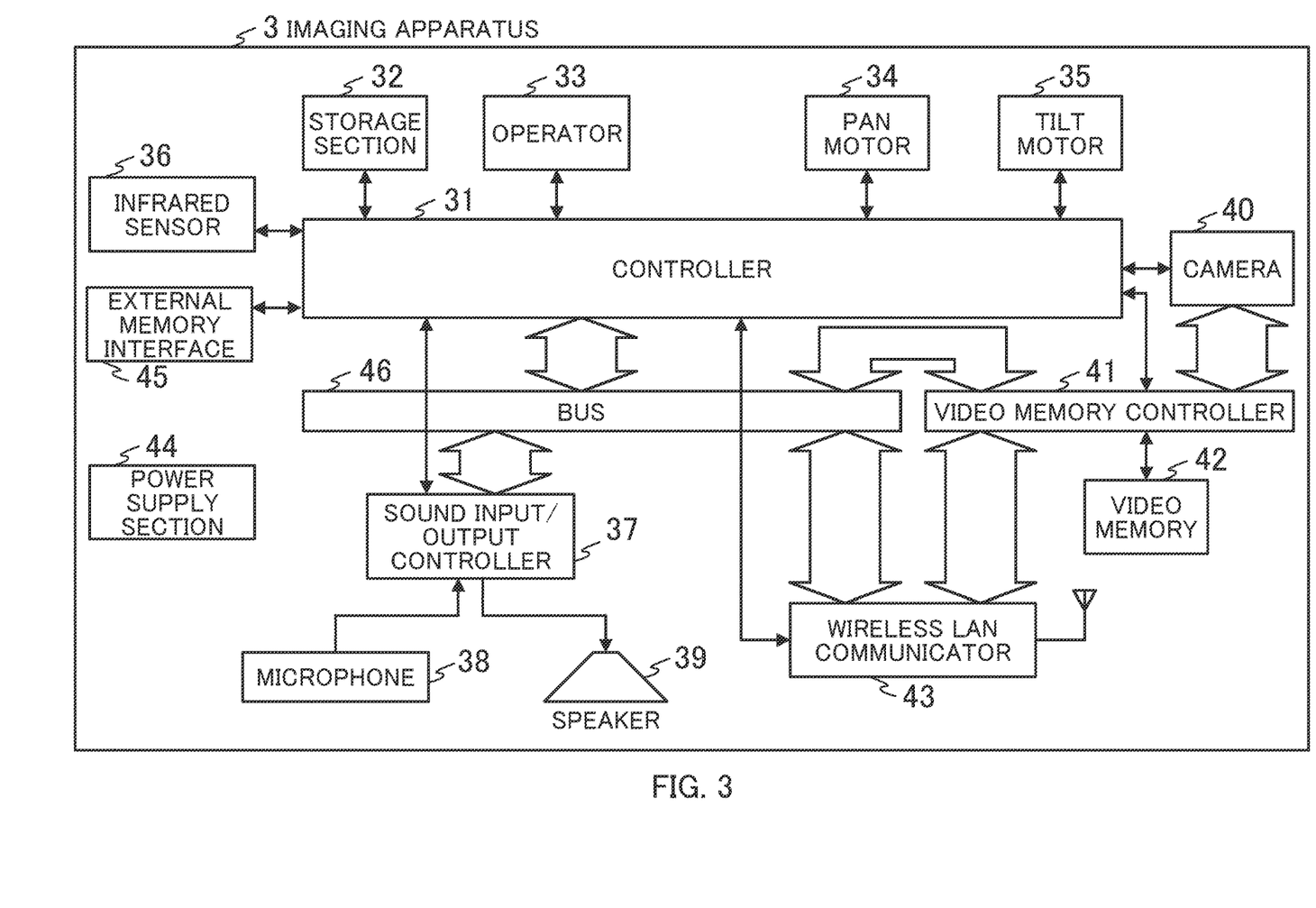
FIG. 3 is a block diagram illustrating a block configuration example of an imaging apparatus.

FIG. 3 is a block diagram illustrating a block configuration example of imaging apparatus 3. As illustrated in FIG. 3, imaging apparatus 3 includes controller 31, storage section 32, operator 33, pan motor 34, tilt motor 35, infrared sensor 36, sound input/output controller 37, microphone 38, speaker 39, camera 40, video memory controller 41, video memory 42, wireless LAN communicator 43, power supply section 44, external memory interface 45, and a bus 46.

Controller 31 controls entire imaging apparatus 3, for example. Controller 31 may be configured with a CPU, for example.

Programs for operating controller 31 are stored in storage section 32. Further, data for performing calculation processing by controller 31, data for control each component by controller 31, and the like are stored in storage section 32. Also, image data of images captured by camera 40 is stored in storage section 32. Storage section 32 may be configured with storage devices such as a RAM, a ROM, a flash memory, and an HDD.

Operator 33 is configured with buttons and the like capable of receiving operations of the user. Operator 33 outputs signals according to the operations of the user to controller 31.

Pan motor 34 is a motor that drives camera 40 in pan directions based on control of controller 31. Tilt motor 35 is a motor that drives camera 40 in tilt directions based on control of controller 31.

Infrared sensor 36 is a PIR (Passive Infra Red) sensor, for example. Infrared sensor 36 detects a person or a pet, for example. Controller 31 may start capturing when motion of the object such as a person or a pet is detected by infrared sensor 36. Further, controller 31 may start capturing when there is a change on the screen of camera 40 (that is, when the object moves). Controller 31 may store image data to be recorded in storage section 32 or in an external memory mounted to external memory interface 45. Wireless LAN communicator 43 may transmit the image data (recorded data) stored in storage section 32 or in the external memory to mobile devices 1a to 1d via router 2.

Sound input/output controller 37, microphone 38, and speaker 39 input and output the sound to and from outside.

Camera 40 includes a lens and an imaging element. The imaging element is an image sensor such as a CCD (Charged Coupled Device) or a CMOS (Complementary Metal Oxide Semiconductor), for example. Camera 40 has a mechanism to be able to move in the pan directions and the tilt directions. Camera 40 can be moved in the pan directions and the tilt direction by pan motor 34 and tilt motor 35.

Video memory controller 41 temporarily buffers (stores) signals of sound (data of sound) collected by microphone 38 to video memory 42 along with image data outputted from camera 40.

Wireless LAN communicator 43 is wirelessly connected to router 2 by using a wireless communication system such as Wi-Fi, for example. Wireless LAN communicator 43 exchanges data with other electronic devices via router 2. Further, wireless LAN communicator 43 reads out the image data (including the sound data) stored in video memory 42 via video memory controller 41. Wireless LAN communicator 43 transmits the read out image data to mobile devices 1a to 1d via router 2.

Power supply section 44 supplies the power required for each component of imaging apparatus 3. An external memory such as a USB memory or an SD card (R) is attached and detached to and from external memory interface 45. The image data of images captured by camera 40 may be stored in the external memory.

Note that imaging apparatus 3 may stop output of the sound by speaker 39 when shifted to Home mode to be described later. Further, imaging apparatus 3 may stop wireless transmission of the video by wireless LAN communicator 43 when shifted to Home mode. Also, imaging apparatus 3 may stop storing the image data in storage section 32 or in the external memory when shifted to Home mode.

Figure 4:
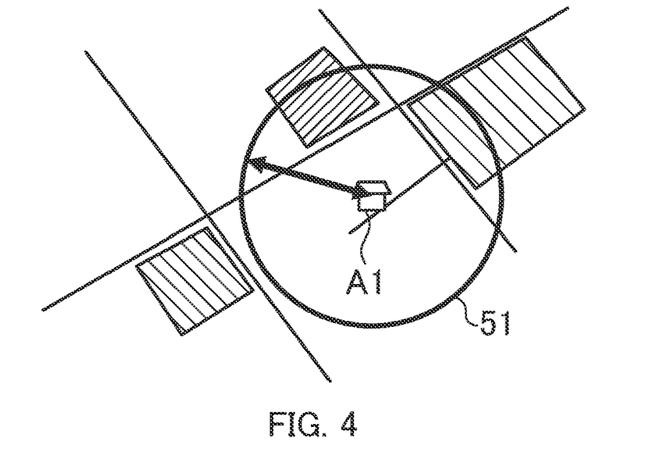
FIG. 4 is a diagram for describing a geo-fence.

FIG. 4 is a diagram for describing a geo-fence. A map is illustrated in FIG. 4. On the map of FIG. 4, building A1 illustrated in FIG. 1 is illustrated. Further, circular geo-fence 51 is illustrated in FIG. 4.

In mobile devices 1a to 1d, the center and radius of geo-fence 51 is set by the user. The center of geo-fence 51 is set as building A1. Geo-fence 51 may also be referred to as a border or an area.

The radius of geo-fence 51 is a distance with which the users are assumed to be away from home when mobile devices 1a to 1d go over geo-fence 51, for example. Therefore, the radius of geo-fence 51 is set such that geo-fence 51 at least surrounds building A1.

Figure 5:
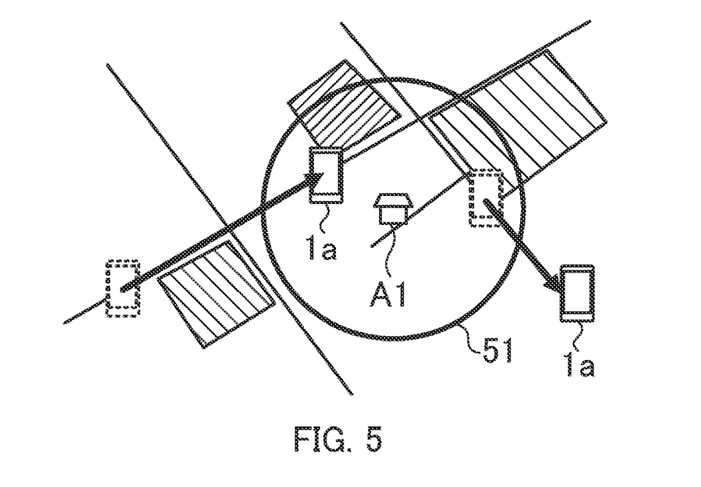
FIG. 5 is a diagram for describing behaviors of the mobile device in the geo-fence.

FIG. 5 is a diagram for describing behaviors of mobile device 1a in geo-fence 51. In FIG. 5, same reference signs are applied to the components same as those illustrated in FIG. 4.

Mobile device 1a acquires the location of mobile device 1a by the GPS signals. Mobile device 1a determines whether or not mobile device 1a has gone over (crossed over) geo-fence 51 based on the acquired location of mobile device 1a. When it is determined that mobile device 1a has gone over geo-fence 51, mobile device 1a notifies imaging apparatus 3 whether it is located out of geo-fence 51 or within geo-fence 51.

For example, when mobile device 1a moves from geo-fence 51 and goes over geo-fence 51 to be located outside geo-fence 51, mobile device 1a notifies imaging apparatus 3 that it is located outside geo-fence 51. Further, when mobile device 1a moves from outside geo-fence 51 and comes back over geo-fence 51 to be located inside geo-fence 51, mobile device 1a notifies imaging apparatus 3 that it is located inside geo-fence 51. Thereby, imaging apparatus 3 determines whether or not the user of mobile device 1a is away from home.

While the case of mobile device 1a is described in FIG. 5, mobile devices 1b to 1d also transmit information regarding whether those devices 1b to 1d are located outside geo-fence 51 or in geo-fence 51 to imaging apparatus 3 in the same manner as that of mobile device 1a.

Further, when registered in imaging apparatus 3, mobile device 1a to 1d can display moving images captured by imaging apparatus 3 and moving images recorded by imaging apparatus 3 on touch panel 13. Mobile devices 1a to 1d registered in imaging apparatus 3 transmit the information regarding whether those devices are located outside or inside geo-fence 51 to imaging apparatus 3.

Figure 6:
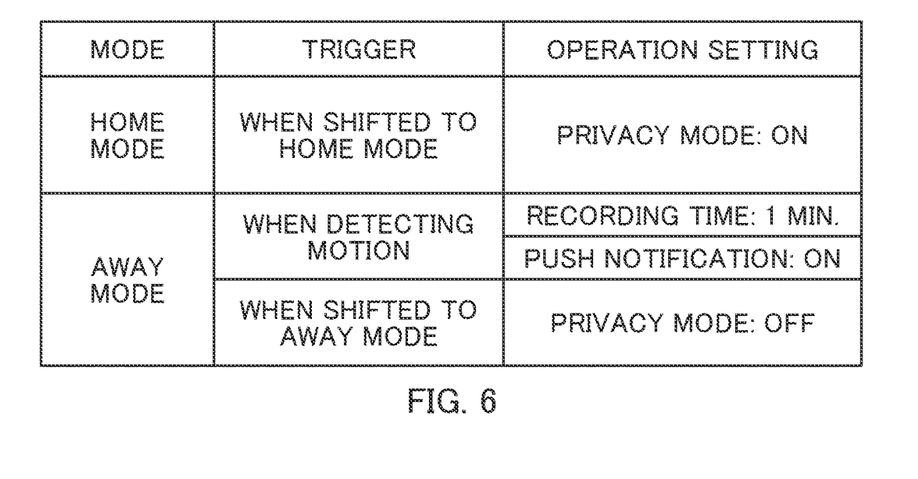
FIG. 6 is a table for describing setting examples of operation modes of the imaging apparatus.

FIG. 6 is a table for describing a setting example of operation modes of imaging apparatus 3. As in FIG. 6, imaging apparatus 3 has two operation modes that are Home mode and Away mode.

As described in FIG. 5, imaging apparatus 3 receives the information from mobile devices 1a to 1d regarding whether mobile devices 1a to 1d are located inside geo-fence 51 or outside geo-fence 51. When even one of mobile devices 1a to 1d is located inside geo-fence 51, imaging apparatus 3 operates in Home mode. In the meantime, when all of mobile devices 1a to 1d are located outside geo-fence 51, imaging apparatus 3 operates in Away mode.

The users can set operations in Home mode and operations in Away mode of imaging apparatus 3 by using mobile devices 1a to 1d that are registered in imaging apparatus 3.

For example, when imaging apparatus 3 turns to Home mode, the users can set from mobile devices 1a to 1d whether or not to operate imaging apparatus 3 in a privacy mode that prohibits capturing. In the case of FIG. 6, the privacy mode in Home mode is set "ON". Therefore, imaging apparatus 3 operates in the privacy mode under Home mode. That is, when even one of the users carrying mobile devices 1a to 1d is staying at home, imaging apparatus 3 prohibits capturing even when an object moves. For example, controller 31 of imaging apparatus 3 inhibits the image data of camera 40 from being stored in video memory 42. Alternatively, controller 31 of imaging apparatus 3 inhibits the image data stored in video memory 42 from being stored in storage section 32 or in the external memory.

Further, in Away mode, the users can set recording time from mobile devices 1a to 1d for which imaging apparatus 3 detects motion of the object and start recording. In the case of FIG. 6, the recording time of imaging apparatus 3 is set as "1 minute". Therefore, upon detecting motion of the object under Away mode, imaging apparatus 3 records a video for 1 minute.

Further, when imaging apparatus 3 detects motion of the object and starts recording a video under Away mode, the users can set from mobile devices 1a to 1d whether or not to receive push notification from imaging apparatus 3. In the case of FIG. 6, the push notification is set "ON". Therefore, upon detecting motion of the object under Away mode, imaging apparatus 3 transmits push notification to mobile devices 1a to 1d via a push server.

Further, when imaging apparatus 3 turns to Away mode, the users can set from mobile devices 1a to 1d whether or not to operate imaging apparatus 3 in the privacy mode that prohibits capturing. In the case of FIG. 6, the privacy mode in Away mode is set "OFF". Therefore, imaging apparatus 3 does not prohibit capturing in Away mode. That is, when all the users carrying mobile devices 1a to 1d are away from home, imaging apparatus 3 starts capturing according to the motion of the object. This makes it possible to prevent the users of mobile devices 1a to 1d from becoming unable to view the moving images of imaging apparatus 3 because the users forgot to cancel the privacy mode. Further, the users of mobile devices 1a to 1d can prevent the moving images captured by imaging apparatus 3 from being unrecorded when all the users are away from home.

Figure 7A:
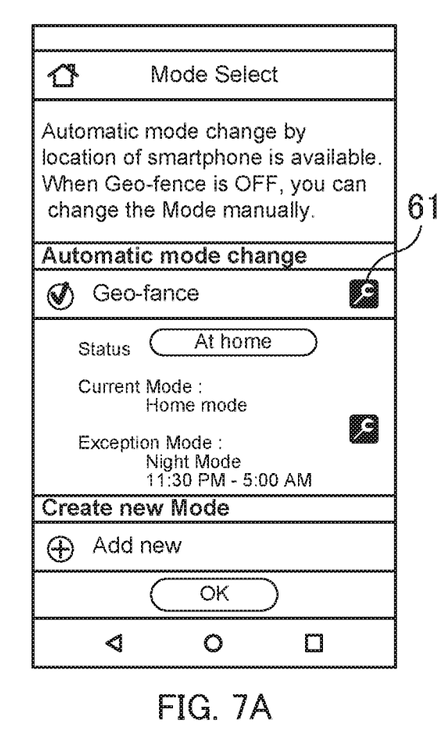
FIG. 7A is a diagram illustrating a screen example of the mobile device in a geo-fence setting.
Figure 7B:
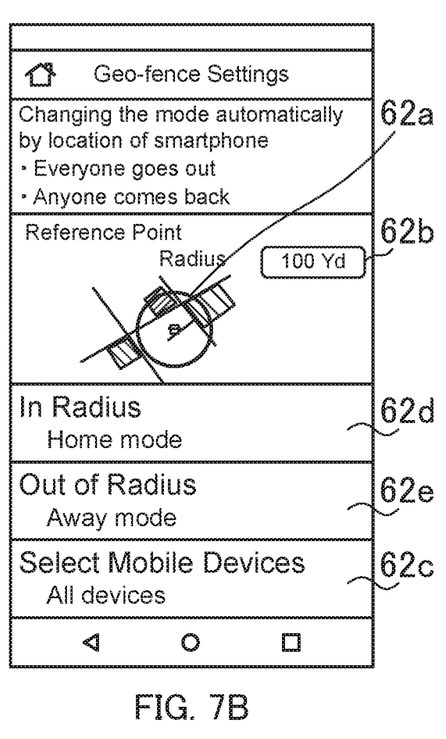
FIG. 7B is a diagram illustrating a screen example of the mobile device in a geo-fence setting.
Figure 7C:
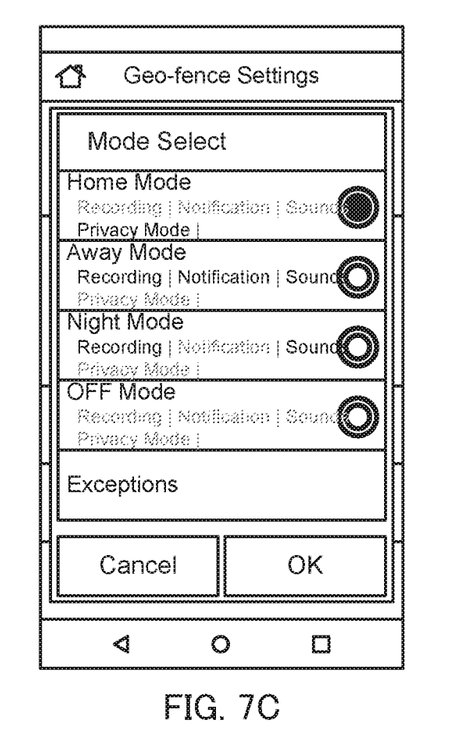
FIG. 7C is a diagram illustrating a screen example of the mobile device in a geo-fence setting.

FIG. 7A to FIG. 7C are diagrams illustrating examples of the screen of mobile device 1a in geo-fence setting. The examples of the screen illustrated in FIG. 7A to FIG. 7C are displayed on touch panel 13 of mobile device 1a.

Mobile device 1a transits the screen of touch panel 13 to the screen illustrated in FIG. 7B when image 61 is tapped in the geo-fence setting screen illustrated in FIG. 7A.

Geo-fence 62a is displayed on the screen illustrated in FIG. 7B. When image 61 illustrated in FIG. 7A is tapped, mobile device 1a acquires the location of mobile device 1a from the GPS signal and displays geo-fence 62a having the acquired location as the center. When geo-fence 62a has already been set, set geo-fence 62a is displayed on touch panel 13.

Geo-fence 62a is the basis for determining whether the users of mobile devices 1a to 1d are staying at home or being away from home. Therefore, the user taps image 61 of FIG. 7A inside building A1, for example. Thereby, geo-fence 62a having building A1 as the center is displayed on touch panel 13 of mobile device 1a. Note that the center of geo-fence 62a may also be set by inputting the address of building A1. Also, the center of geo-fence 62a may also be set by inputting the latitude and longitude of building A1.

Text box 62b is displayed on the screen illustrated in FIG. 7B. Text box 62b receives the radius of geo-fence 62a from the user. Mobile device 1a changes the size of geo-fence 62a displayed on touch panel 13 according to the received radius.

Text 62c is displayed on the screen illustrated in FIG. 7B. Shown in text 62c is the mobile device as the determination target of geo-fence 62a (the mobile device to be the target of determining whether it is located outside or inside geo-fence 62a). In the case of FIG. 7B, it is illustrated that all of mobile devices 1a to 1d (All devices) registered in imaging apparatus 3 are the determination target of geo-fence 62a. That is, it is determined whether all of mobile devices 1a to 1d are located out of geo-fence 62a or in geo-fence 62a.

Note that the user can select mobile devices 1a to 1d to be the determination target of geo-fence 62a. For example, the user selects mobile devices 1a, 1b carried by the parents and does not select mobile devices 1c, 1d carried by the children. In such case, imaging apparatus 3 starts capturing when the parents carrying mobile devices 1a, 1b go out even though the children carrying mobile devices 1c, 1d are staying at home. Hereinafter, explanations are provided assuming that all of mobile devices 1a to 1d are the determination target of geo-fence 62a.

On the screen illustrated in FIG. 7B, text 62d is displayed. Illustrated in text 62d is the operation mode of imaging apparatus 3 when at least one of mobile devices 1a to 1d is located in geo-fence 62a. In text 62d, it is displayed that imaging apparatus 3 operates in Home mode when at least one of mobile devices 1a to 1d is located in geo-fence 62a.

On the screen illustrated in FIG. 7B, text 62e is displayed. Shown in text 62e is the operation mode of imaging apparatus 3 when all of mobile devices 1a to 1d registered in imaging apparatus 3 are located out of geo-fence 62a. In text 62e, it is displayed that imaging apparatus 3 operates in Away mode when all of mobile devices 1a to 1d are located out of geo-fence 62a.

The user can change the operation mode of imaging apparatus 3 when at least one of mobile devices 1a to 1d is located in Geo-fence 62a by tapping text 62d.

FIG. 7C shows an example of the screen when text 62d of FIG. 7B is tapped. The user can select the operation mode of imaging apparatus 3 when at least one of mobile devices 1a to 1d is located in geo-fence 62a by tapping a radio button illustrated in FIG. 7C. In the case of FIG. 7C, Home mode is selected.

In a case where text 62e of FIG. 7B is tapped, the user can also select the operation mode of imaging apparatus 3 when all of mobile devices 1a to 1d are out of geo-fence 62a as in the case of tapping text 62d.

While the setting example of Geo-fence in mobile device 1a is described above, mobile devices 1b to 1d can also set the geo-fence in the same manner as that of mobile device 1a.

Further, information set by mobile device 1a is transmitted to imaging apparatus 3 and stored in imaging apparatus 3. For example, the information such as the center and radius of geo-fence 62a set in mobile device 1a is transmitted to imaging apparatus 3 and stored in storage section 32 of imaging apparatus 3. Imaging apparatus 3 transmits the information stored in storage section 32 to mobile devices 1b to 1d. Thereby, the information set in mobile device 1a is shared by mobile devices 1a to 1d.

Figure 8:
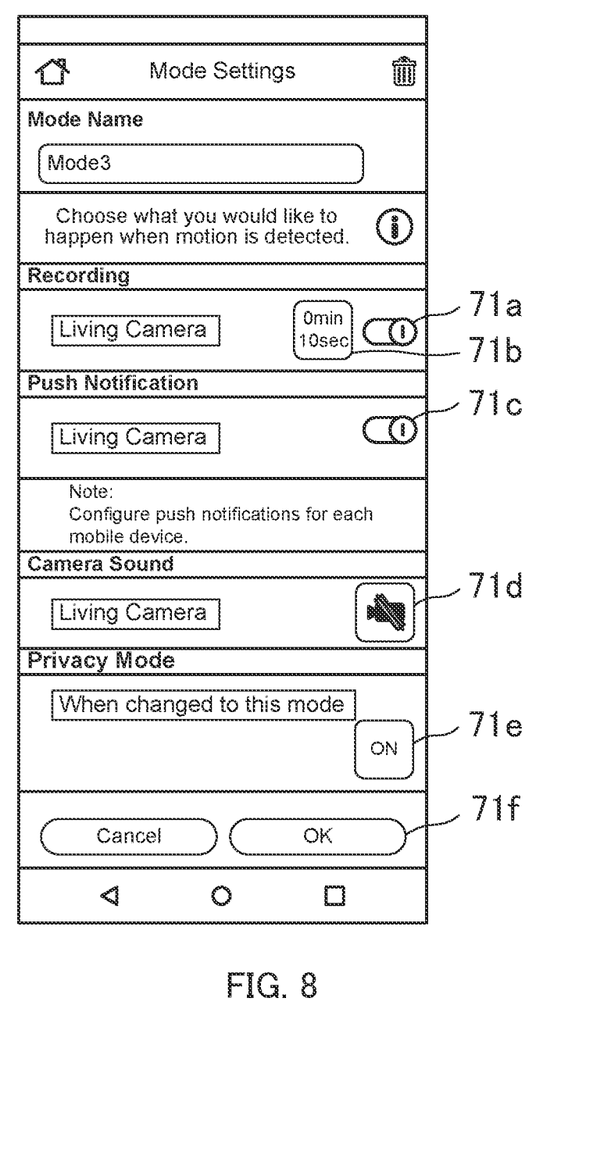
FIG. 8 is a diagram illustrating a setting example in Away mode of the imaging apparatus.

FIG. 8 is a diagram for describing a setting example in Away mode of imaging apparatus 3. An example of the screen illustrated in FIG. 8 is displayed on touch panel 13 of mobile device 1a. On the screen illustrated in FIG. 8, toggle buttons 71a, 71c, select boxes 71b, 71d, and buttons 71e, 71f are displayed.

Toggle button 71a is a switch for setting whether or not to record a video by imaging apparatus 3 when imaging apparatus 3 detects motion of the object.

Select box 71b is a box for setting the recording time. When select box 71b is tapped, mobile device 1a displays some candidates for the recording time of imaging apparatus 3. The user selects the recording time of imaging apparatus 3 from the displayed candidates for the recording time.

Toggle button 71c is a switch for setting whether or not imaging apparatus 3 transmits push notification when imaging apparatus 3 detects motion of the object.

Select box 71d is a box for selecting kinds of sound (including mute) generated by imaging apparatus 3 when imaging apparatus 3 detects motion of the object. When select box 71d is tapped, mobile device 1a displays some candidates for the kinds of sound (including mute) generated from imaging apparatus. The user selects the sound desired to be generated from imaging apparatus 3 from the displayed candidates for the kinds of sound.

Button 71e is a button for setting whether or not to set the privacy mode effective when imaging apparatus 3 shifts the operation to Away mode. In the case of FIG. 8, the privacy mode turns effective when imaging apparatus 3 shifts the operation to Away mode.

When button 71f is tapped, mobile device 1a transmits the information set on the screen of FIG. 8 to imaging apparatus 3. Imaging apparatus 3 updates the setting based on the information transmitted from mobile device 1a.

While the setting example of Away mode in mobile device 1a is described above, mobile devices 1b to 1d can also set Away mode in the same manner as that of mobile device 1a.

Figure 9:
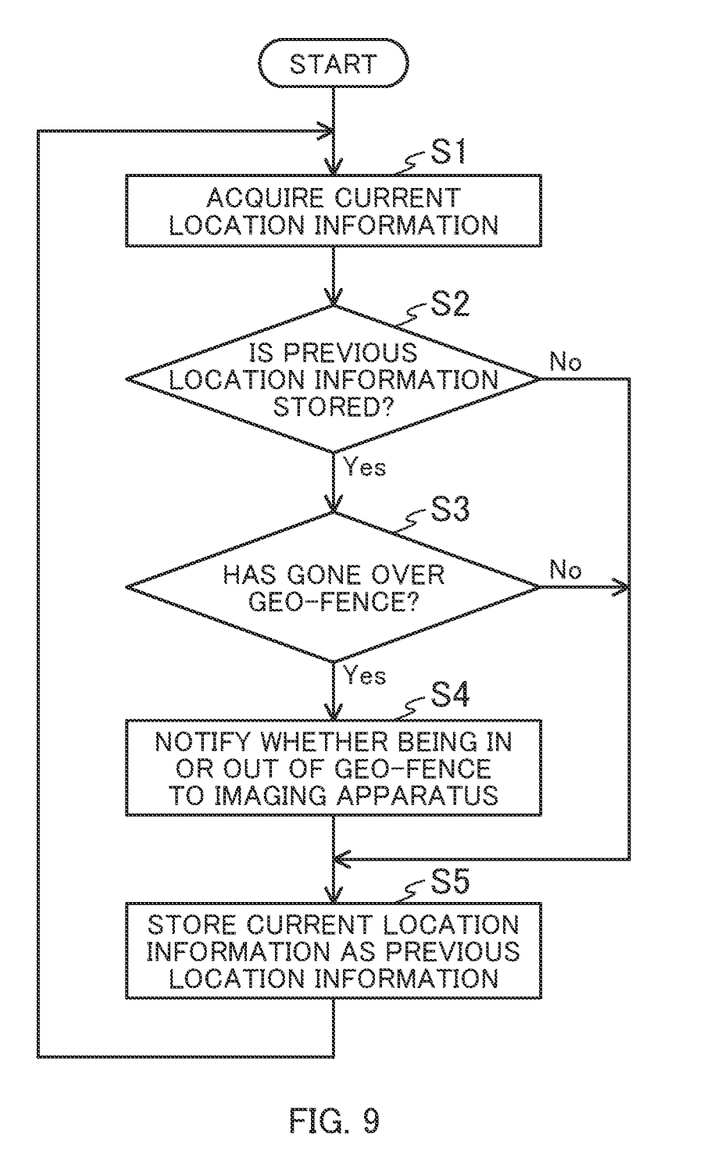
FIG. 9 is a flowchart illustrating an operation example of the mobile device in the geo-fence.

FIG. 9 is a flowchart illustrating an operation example of mobile device 1a in the geo-fence. Controller 11 of mobile device 1a acquires current location information from GPS receiver 21 (step S1).

Controller 11 of mobile device 1a determines whether or not the previous location information is stored in storage section 12 (step S2).

When it is determined in step 2 that the previous location information is not stored in storage section 12 ("No" in S2), controller 11 of mobile device 1a shifts the processing to step S5. In the meantime, when it is determined in step 2 that the previous location information is stored in storage section 12 ("Yes" in S2), controller 11 of mobile device 1a compares the previous location information with the current location information acquired in step S1 and determines whether or not mobile device 1a has gone over (crossed over) the geo-fence (step S3).

When it is determined in step S3 that mobile device 1a has not gone over the geo-fence ("No" in S3), controller 11 of mobile device 1a shifts the processing to step S5. In the meantime, when it is determined in step S3 that mobile device 1a has gone over the geo-fence ("Yes" in S3), controller 11 of mobile device 1a notifies imaging apparatus 3 whether mobile device 1a is located in the geo-fence or out of the geo-fence (step S4).

As described in FIG. 4 and FIG. 7B, the center and the radius of the geo-fence are set in mobile device 1a. Controller 11 of mobile device 1a can determine whether mobile device 1a is located in the geo-fence or located out of the geo-fence from the location information of mobile device 1a acquired in step S1 and the set center and radius of the geo-fence.

When it is determined as "No" in step S2 or "No" in step S3, controller 11 of mobile device 1a stores the current location information in storage section 12 as the previous location information (step S5) after executing the processing of step S4.

While the operation example of mobile device 1a is described in FIG. 9, mobile devices 1b to 1d also perform the same operation as that of mobile device 1a.

Figure 10:
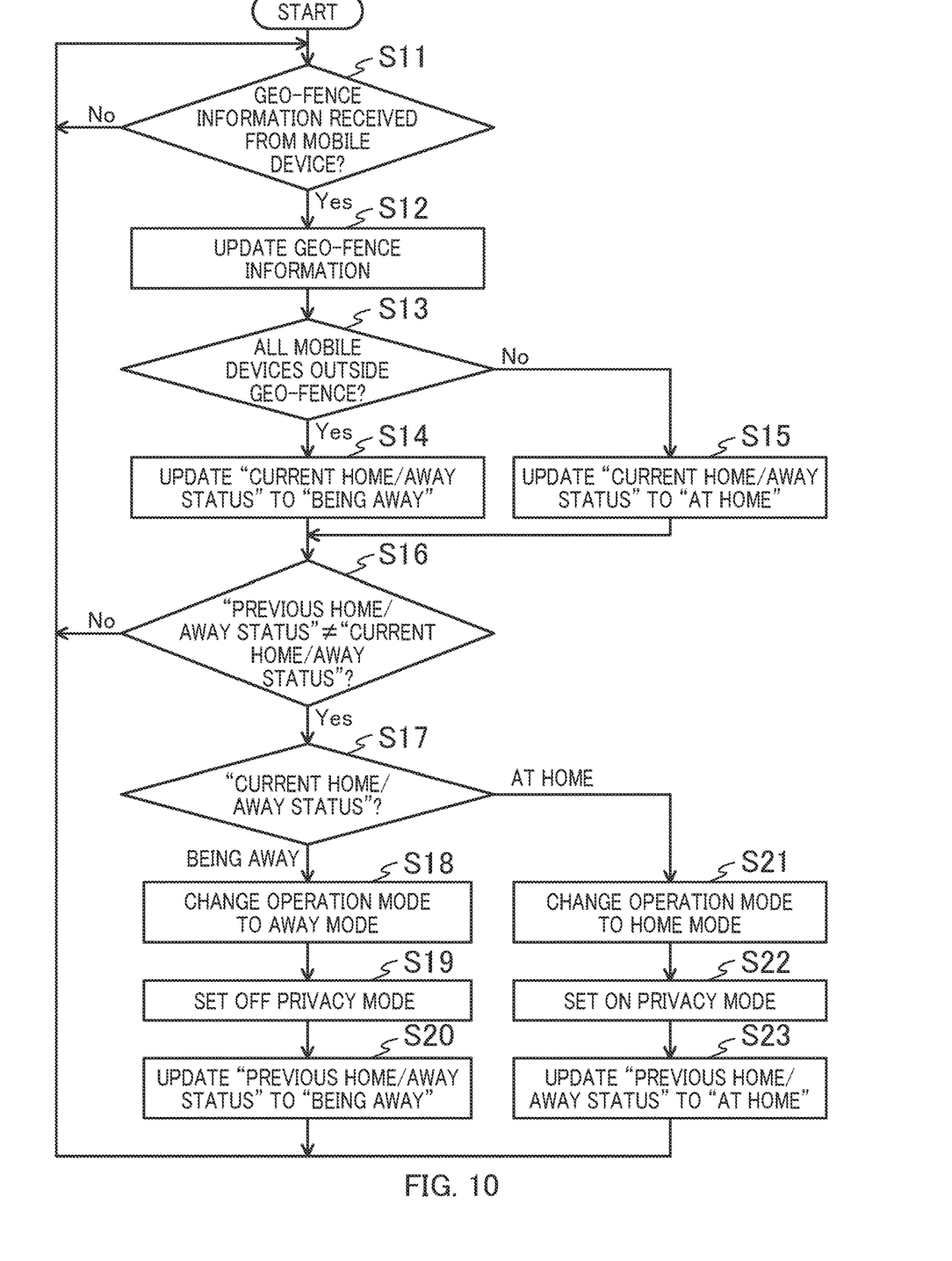
FIG. 10 is a flowchart illustrating an operation example of the imaging apparatus.

FIG. 10 is a flowchart illustrating an operation example of imaging apparatus 3. Controller 31 of imaging apparatus 3 determines whether or not geo-fence information indicating whether mobile devices 1a to 1d are located in the geo-fence or located out of the geo-fence is received from mobile devices 1a to 1d (step S11). When it is determined that the geo-fence information is not received from mobile devices 1a to 1d ("No" in S11), controller 31 of imaging apparatus 3 continues the processing of step S11. In the meantime, when it is determined that the geo-fence information is received from mobile devices 1a to 1d ("Yes" in S11), controller 31 of imaging apparatus 3 updates the geo-fence information of mobile devices 1a to 1d (step S12).

Figure 11:
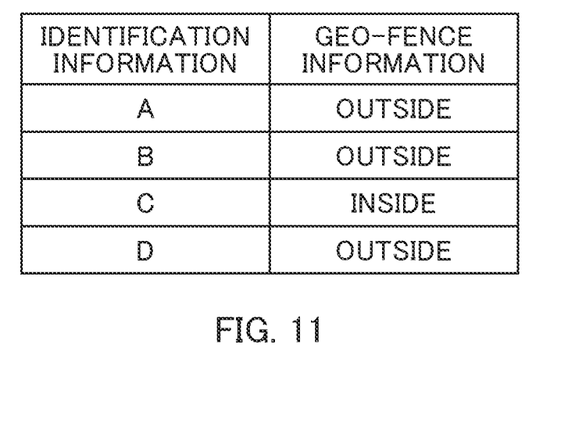
FIG. 11 is a chart illustrating an example of a table for managing geo-fence information of the mobile device.

FIG. 11 is a chart illustrating an example of a table for managing the geo-fence information of mobile devices 1a to 1d. The table illustrated in FIG. 11 is stored in storage section 32. As illustrated in FIG. 11, identification information of mobile devices 1a to 1d registered in imaging apparatus 3 and the geo-fence information of mobile devices 1a to 1d are stored in the table. "A" to "D" shown in FIG. 11 are the identification information of mobile devices 1a to 1d. When the geo-fence information is received from mobile devices 1a to 1d, controller 31 of imaging apparatus 3 updates the geo-fence information of the table stored in storage section 32.

The geo-fence information indicates whether mobile devices 1a to 1d are located in the geo-fence or located out of the geo-fence. For example, "inside" shown in FIG. 11 indicates that mobile devices 1a to 1d are located in the geo-fence, and "outside" shown in FIG. 11 indicates that mobile devices 1a to 1d are located out of the geo-fence.

Returning to FIG. 10, controller 31 of imaging apparatus 3 refers to the table in storage section 32 to determine whether or not all of mobile devices 1a to 1d are located outside the geo-fence (step S13). When it is determined that all of mobile devices 1a to 1d are located outside the geo-fence ("Yes" in S13), controller 31 of imaging apparatus 3 updates current home/away status to "being away" (step S14). In the meantime, when it is determined that any of mobile devices 1a to 1d is inside the geo-fence ("No" in S13), controller 31 of imaging apparatus 3 updates the current home/away status to "at home" (step S15). Note that "current home/away status" is a variable, for example, and stored in storage section 32.

Controller 31 of imaging apparatus 3 determines whether or not the previous home/away status and the current home/away status are different (step S16). When it is determined that the previous home/away status and the current home/away status are not different ("No" in S16), controller 31 of imaging apparatus 3 shifts the processing to step S11. In the meantime, when it is determined that the previous home/away status and the current home/away status are different ("Yes" in S16), controller 31 of imaging apparatus 3 determines whether the current home/away status is "being away" or "at home" (step S17). Note that "previous home/away status" is a variable, for example, and stored in storage section 32.

When it is determined that the current home/away status is "being away" ("being away" in S17), controller 31 of imaging apparatus 3 changes the operation mode to Away mode (step S18), sets off the privacy mode (step S19), and updates the previous home/away status to "being away" (step S20). Then, controller 31 of imaging apparatus 3 shifts the processing to step S11.

When it is determined that the current home/away status is "at home" ("at home" in S17), controller 31 of imaging apparatus 3 changes the operation mode to Home mode (step S21), sets on the privacy mode (step S22), and updates the previous home/away status to "at home" (step S23). Then, controller 31 of imaging apparatus 3 shifts the processing to step S11.

As described above, imaging apparatus 3 includes: camera 40; wireless LAN communicator 43 that receives the geo-fence information regarding the distance with respect to building A1 from each of mobile devices 1a to 1d; and controller 31 that has Away mode (privacy mode is OFF) in which capturing by camera 40 is started when an object moves and Home mode in which capturing by camera 40 is not started even when the object moves, and switches between Away mode and Home mode based on the geo-fence information. Thereby, imaging apparatus 3 can set camera 40 not to perform capturing when the users carrying mobile devices 1a to 1d that enable viewing of the images of camera 40 are in building A1. Further, it is possible with imaging apparatus 3 to protect the privacy of the user staying in building A1.

Modification Example 1

In the above, all of mobile devices 1a to 1d are the determination target of the geo-fence. In such case, when there is a mobile device being left alone in building A1, imaging apparatus 3 always operates in Home mode. Therefore, imaging apparatus 3 excludes the mobile device that is not carried out from building A1 from the determination target of geo-fence.

Figure 12:
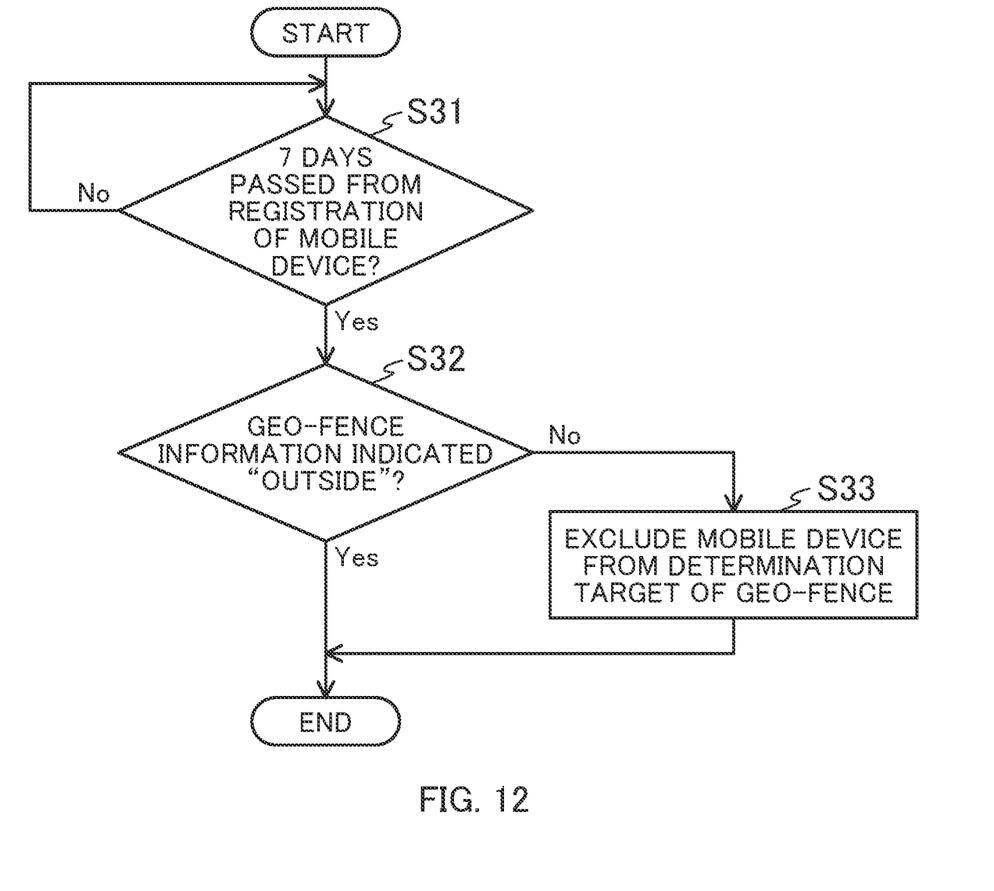
FIG. 12 is a flowchart illustrating an example of processing for excluding a determination target of the geo-fence.

FIG. 12 is a flowchart illustrating an example of processing for excluding the determination target of the geo-fence. Controller 31 of imaging apparatus 3 executes the processing of the flowchart illustrated in FIG. 12 on each of mobile devices 1a to 1d registered in imaging apparatus 3.

Controller 31 of imaging apparatus 3 determines whether or not 7 days have passed from registration of the mobile device (step S31). When it is determined that 7 days have not passed from registration of the mobile device ("No" in S31), controller 31 of imaging apparatus 3 continues the processing of step S31. In the meantime, when it is determined that 7 days have passed from registration of the mobile device ("Yes" in S31), controller 31 of imaging apparatus 3 determines whether or not the geo-fence information of the mobile device turned to "outside" even once during the 7 days (step S32).

When it is determined that the geo-fence information of the mobile device turned to "outside" even once during the 7 days ("Yes" in S32), controller 31 of imaging apparatus 3 ends the processing of the flowchart. In the meantime, when it is not determined that the geo-fence information of the mobile device turned to "outside" even once during the 7 days ("No" in S32), controller 31 of imaging apparatus 3 excludes the mobile device from the determination target of the geo-fence (step S33). For example, controller 31 of imaging apparatus 3 does not make a determination regarding switching between Home mode and Away mode by using the geo-fence information transmitted from the mobile device that is determined to be excluded from the determination target of the geo-fence. That is, controller 31 of imaging apparatus 3 excludes the geo-fence information transmitted from the mobile device that is not moved out of the geo-fence during a prescribed period to switch between Home mode and Away mode.

As described, controller 11 determines whether or not each of mobile devices 1a to 1d are moved away (located out of the geo-fence) from building A1 during a prescribed period. Controller 11 gives an instruction to mobile devices 1a to 1d that are not moved away from building A1 during the prescribed period by a prescribed distance (not located out of the geo-fence) not to transmit the geo-fence information. Thereby, imaging apparatus 3 can avoid always operating in Home mode because of the mobile device being left alone in building A1.

Note that the period is not limited to "7 days" set in step S31. It is set as "7 days" assuming that the mobile device that is carried out from building A1 may well be carried out at least once in a week.

Modification Example 2

Controller 31 of imaging apparatus 3 may also have Exception mode in Home mode. Exception mode is a mode in which capturing is started when an object moves even in Home mode.

For example, at least one of the residents of building A1 finishes work or school and returns to building A1. In such case, controller 31 of imaging apparatus 3 shifts to Home mode. Controller 31 of imaging apparatus 3 operates in Home mode until all of the residents of building A1 go to work or school the next day, for example.

However, it may be desired to perform capturing by imaging apparatus 3 while sleeping for the security reasons, for example. Therefore, controller 31 of imaging apparatus 3 has Exception mode in Home mode.

Figure 13:
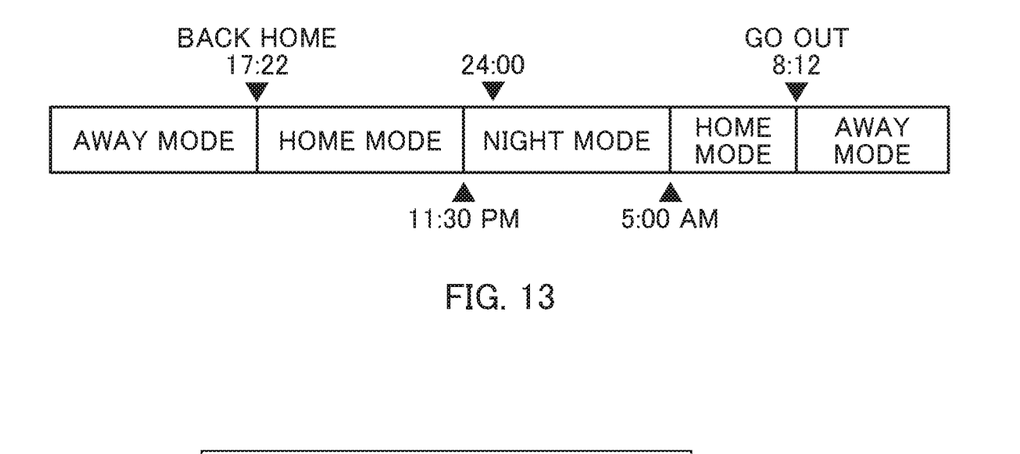
FIG. 13 is a chart for describing Exception mode.

FIG. 13 is a chart for describing Exception mode. Night mode shown in FIG. 13 is set as Exception mode of Home mode. Night mode is set in imaging apparatus 3 via mobile devices 1*a* to 1*d*. In the case of FIG. 13, Night mode is set from 11:30 pm to 5:00 am.

As illustrated in FIG. 13, while imaging apparatus 3 is originally supposed to operate in Home mode from 5:22 pm at which at least one of the residents of building A1 returns home until 8:12 am at which all the residents go out, imaging apparatus 3 operates in Night mode from 11:30 pm to 5:00 am. That is, imaging apparatus 3 starts capturing by camera 40 when an object moves between 11:30 pm and 5:00 am.

Figure 14:
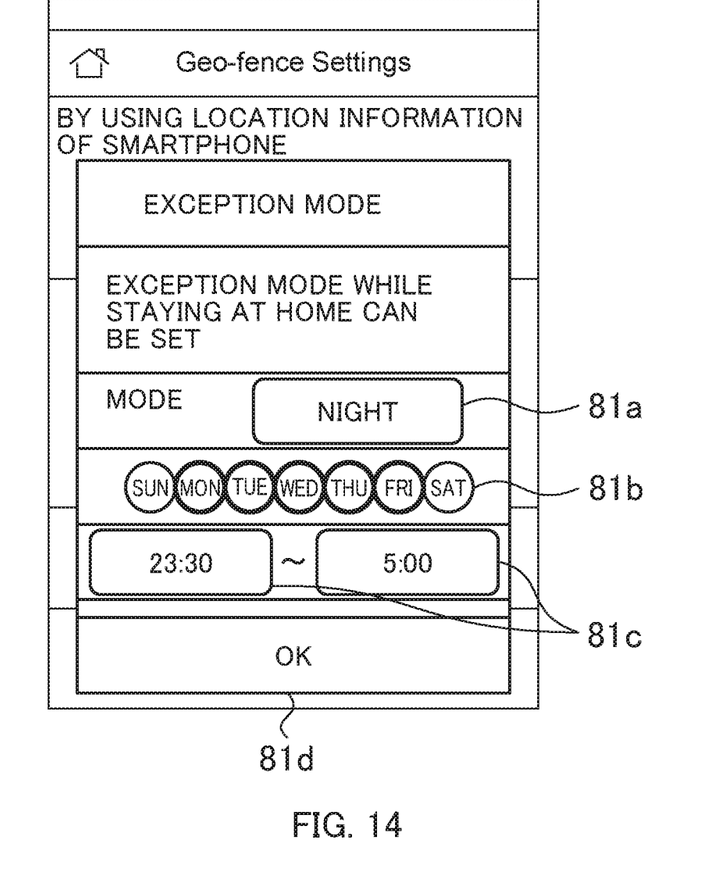
FIG. 14 is a diagram for describing setting of Exception mode.

FIG. 14 is a diagram for describing setting of Exception mode. In FIG. 14, illustrated is an example of the screen displayed on touch panel 13. On touch panel 13 of mobile device 1*a*, button 81*a* for selecting Exception mode is displayed. When button 81*a* is tapped, mobile device 1*a* displays a mode select screen illustrated in FIG. 7C on touch panel 13, for example. The user can select Exception mode from the mode select screen. "Night mode" shown in FIG. 7C corresponds to Exception mode. The user selects "Night mode" herein.

On touch panel 13 of mobile device 1*a*, button 81*b* for designating a day of the week for setting Exception mode and text box 81*c* for designating the time of Exception mode are displayed.

When button 81*b* is tapped, controller 11 of mobile device 1*a* transmits information inputted on touch panel 13 to imaging apparatus 3. Imaging apparatus 3 sets Exception mode based on the information received from mobile device 1*a*.

As described above, even when operating in Home mode, controller 31 of imaging apparatus 3 starts capturing by camera 40 when an object moves during a designated period designated from mobile devices 1*a* to 1*d*. Thereby, controller 31 of imaging apparatus 3 can perform capturing when the residents of building A1 desire to do so even when the residents of building A1 are staying at home.

Modification Example 3

Controller 31 of imaging apparatus 3 may transmit image data (moving image data) of images captured by camera 40 in response to a request from mobile devices 1*a* to 1*d* in Away mode. Controller 31 of imaging apparatus 3 may control pan motor 34 and tilt motor 35 to change capturing directions of camera 40 in accordance with the instruction of mobile devices 1*a* to 1*d* while transmitting the moving image data to mobile devices 1*a* to 1*d*.

As described, controller 31 of imaging apparatus 3 transmits the moving images of camera 40 to mobile devices 1*a* to 1*d* in response to the request from mobile devices 1*a* to 1*d* in Away mode. This enables the residents being away from building A1 to see the state inside building A1 in real time.

Modification Example 4

When the operation is shifted to Home mode, controller 31 of imaging apparatus 3 may direct the lens of camera 40 to face upward (for example, right above). Further, when the operation is shifted to Home mode, controller 31 of imaging apparatus 3 may close the shutter to cover the front of the lens of camera 40. That is, when shifted to Home mode, controller 31 of imaging apparatus 3 physically disables camera 40 from capturing. Thereby, the residents staying in building A1 feel less sense of being captured by imaging apparatus 3.

Modification Example 5

Controller 31 of imaging apparatus 3 may give an instruction to mobile devices 1*a* to 1*d* designated by the user not to perform determination processing of the geo-fence (not to transmit the geo-fence information).

For example, controller 31 of imaging apparatus 3 receives the information of the mobile device from the user via operator 33. Controller 31 of imaging apparatus 3 gives an instruction to the mobile device the information of which is received via operator 33 not to perform the determination processing of the geo-fence.

The mobile device that is designated not to perform the determination processing of the geo-fence may be defined as the mobile devices carried by the children, for example. Thereby, imaging apparatus 3 starts capturing when the parents go out even when the children are staying at home. Therefore, the parents can watch over the children staying by themselves in building A1.

Each functional block used for describing the above Embodiment is achieved as an LSI that is typically an integrated circuit. Those may be individually formed as a single chip or a part of or a whole part thereof may be formed as a single chip. While it is referred to as the LSI herein, such circuit may also be referred to as an IC, a system LSI, a super LSI, or an ultra LSI depending on its integration degree.

Also, the way of implementing the integrated circuit is not limited to the LSI but may also be achieved by a dedicated circuit or a general-purpose processor. After manufacturing the LSI, an FPGA (Field Programmable Gate Array) capable of programming or a reconfigurable processor capable of reconfiguring connection and setting of circuit cells inside the LSI may be used.

Further, when there is a technology of integrated circuit appeared to replace the LSI due to the progress in the semiconductor technology or other technologies derived therefrom, the functional blocks may naturally be integrated by using such technology. Application and the like of biotechnology are possible.

INDUSTRIAL APPLICABILITY

The present disclosure is effective for an image capturing system that displays, on mobile devices, images captured by an imaging apparatus disposed within a building.

REFERENCE SIGNS LIST

1*a* to 1*d* Mobile device
2 Router

3 Imaging apparatus
4 Network
A1 Building
11, 31 Controller
12, 32 Storage section
13 Touch panel
14 Smartphone communicator
15, 37 Sound input/output controller
16, 38 Microphone
17, 39 Speaker
18, 43 Wireless LAN communicator
19 USB communicator
20 Secondary battery
21 GPS receiver
22, 46 Bus
33 Operator
34 Pan motor
35 Tilt motor
36 Infrared sensor
40 Camera
41 Video memory controller
42 Video memory
44 Power supply section
45 External memory interface

The invention claimed is:

1. An imaging apparatus configured to be disposed within a building and wirelessly transmit a captured image to a plurality of electronic devices, the imaging apparatus comprising:
   a camera;
   a receiver configured to receive geo-fence information from each of the plurality of electronic devices, the geo-fence information regarding a distance with respect to the building; and
   a controller configured to:
     set a first operation mode in which the camera starts capturing in response to an object moving, and a second operation mode in which the camera does not start capturing even when the object moves;
     determine whether or not an amount of time has elapsed from registration of each of the plurality of electronic devices with the imaging apparatus;
     determine whether or not each of the plurality of electronic devices is away from the building by at least a distance during the amount of time based on the geo-fence information received from each of the plurality of electronic devices; and
     switch between the first operation mode and the second operation mode, wherein,
   in a case where (1) the amount of time has elapsed from registration of a first electronic device of the plurality of electronic devices, (2) the first electronic device is not away from the building by at least the distance during the amount of time, and (3) the amount of time has not elapsed from registration of a second electronic device of the plurality of electronic devices or the second electronic device is away from the building by at least the distance during the amount of time, the controller
     excludes the geo-fence information received from the first electronic device from being used to determine whether to switch between the first operation mode and the second operation mode, and
     switches between the first operation mode and the second operation mode using the geo-fence information received from the second electronic device, and without using the geo-fence information received from the first electronic device.

2. The imaging apparatus according to claim 1, wherein, the controller operates in the first operation mode in a case where the controller determines that all of the plurality of electronic devices are away from the building by at least the distance, and operates in the second operation mode in a case where the controller determines that even one of the plurality of electronic devices is not away from the building by at least the distance.

3. The imaging apparatus according to claim 2, wherein the controller is configured to set a third operation mode in which the camera starts capturing in response to an object moving during a designated period designated by any of the plurality of electronic devices, even while the controller operates in the second operation mode.

4. The imaging apparatus according to claim 2, wherein, in the first operation mode, the controller transmits a moving image of the camera to the plurality of electronic devices in response to a request from any of the plurality of electronic devices.

5. The imaging apparatus according to claim 1, wherein the controller physically disables the camera from capturing in response to switching to the second operation mode.

6. An imaging method of an imaging apparatus configured to be disposed within a building and wirelessly transmit a captured image to a plurality of electronic devices, the imaging method comprising:
   receiving geo-fence information from each of the plurality of electronic devices, the geo-fence information regarding a distance with respect to the building;
   determining whether or not an amount of time has elapsed from registration of each of the plurality of electronic devices with the imaging apparatus;
   determining whether or not each of the plurality of electronic devices is away from the building by at least a distance during the amount of time based on the geo-fence information received from each of the plurality of electronic devices;
   switching between a first operation mode in which a camera starts capturing in response to an object moving, and a second operation mode in which the camera does not start capturing even when the object moves, wherein,
   in a case where (1) the amount of time has elapsed from registration of a first electronic device of the plurality of electronic devices, (2) the first electronic device is not away from the building by at least the distance during the amount of time, and (3) the amount of time has not elapsed from registration of a second electronic device of the plurality of electronic devices or the second electronic device is away from the building by at least the distance during the amount of time, the switching between the first operation mode and the second operation mode includes
     excluding the geo-fence information received from the first electronic device from being used to determine whether to switch between the first operation mode and the second operation mode, and
     switching between the first operation mode and the second operation mode using the geo-fence information received from the second electronic device, and without using the geo-fence information received from the first electronic device.

7. The imaging apparatus according to claim 1, wherein, in the case where (1) the amount of time has elapsed from registration of the first electronic device of the plurality of electronic devices, (2) the first electronic device is not away from the building by at least the distance during the amount of time, and (3) the amount of time has not elapsed from registration of the second electronic device of the plurality of electronic devices or the second electronic device is away from the building by at least the distance during the amount of time, the controller instructs the first electronic device to halt further transmission of geo-fence information.

* * * * *